(12) United States Patent
Bonanno et al.

(10) Patent No.: US 9,747,103 B2
(45) Date of Patent: *Aug. 29, 2017

(54) AUXILIARY BRANCH PREDICTION WITH USEFULNESS TRACKING

(71) Applicant: International Business Machines Corporation, Armonk, NY (US)

(72) Inventors: James J. Bonanno, Wappingers Falls, NY (US); Michael J. Cadigan, Jr., Poughkeepsie, NY (US); Matthias D. Heizmann, Poughkeepsie, NY (US); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,280

(22) Filed: Aug. 24, 2016

(65) Prior Publication Data

US 2017/0168825 A1 Jun. 15, 2017

Related U.S. Application Data

(63) Continuation of application No. 14/969,492, filed on Dec. 15, 2015, now Pat. No. 9,507,598.

(51) Int. Cl.
*G06F 9/30* (2006.01)
*G06F 9/38* (2006.01)

(52) U.S. Cl.
CPC ........ *G06F 9/30058* (2013.01); *G06F 9/3806* (2013.01); *G06F 9/3808* (2013.01); *G06F 9/3861* (2013.01)

(58) Field of Classification Search
CPC ... G06F 9/3806; G06F 9/3808; G06F 9/30058
See application file for complete search history.

(56) References Cited

U.S. PATENT DOCUMENTS 6,412,050 B1 * 6/2002 Jourdan ................ G06F 9/3806
 711/133
6,532,521 B1 * 3/2003 Arimilli .............. G06F 9/30047
 711/122

(Continued)

OTHER PUBLICATIONS

List of IBM Patents or Patent Applications Treated as Related, dated Sep. 14, 2016, 2 pages.

(Continued)

*Primary Examiner* — Yuqing Xiao
(74) *Attorney, Agent, or Firm* — Cantor Colburn LLP; Margaret A. McNamara

(57) ABSTRACT

According to an aspect, management of auxiliary branch prediction in a processing system including a primary branch predictor and an auxiliary branch predictor is provided. A congruence class of the auxiliary branch predictor is located based on receiving a primary branch predictor misprediction indicator corresponding to a mispredicted target address of the primary branch predictor. An entry is identified in the congruence class having an auxiliary usefulness level set to a least useful level with respect to one or more other entries of the congruence class. Auxiliary data corresponding to the mispredicted target address is installed into the entry. The auxiliary usefulness level of the entry is reset to an initial value based on installing the auxiliary data.

20 Claims, 8 Drawing Sheets

(56) References Cited

U.S. PATENT DOCUMENTS

| | | | |
|---|---|---|---|
| 6,996,678 B1* | 2/2006 | Sharma | G06F 12/121 711/118 |
| 7,062,607 B2* | 6/2006 | Solomon | G06F 9/3808 711/118 |
| 7,069,426 B1* | 6/2006 | Hummel | G06F 9/3848 712/240 |
| 7,107,437 B1* | 9/2006 | Padwekar | G06F 9/3806 712/237 |
| 7,165,168 B2* | 1/2007 | McDonald | G06F 12/0875 711/E12.02 |
| 7,707,396 B2* | 4/2010 | Bradford | G06F 9/30094 712/238 |
| 8,832,418 B2* | 9/2014 | McDonald | G06F 9/3806 712/239 |
| 2005/0204120 A1* | 9/2005 | Prasky | G06F 9/325 712/238 |
| 2008/0052499 A1* | 2/2008 | Koc | G06F 9/3806 712/238 |
| 2009/0222645 A1* | 9/2009 | Moyer | G06F 9/30058 712/205 |
| 2010/0228957 A1* | 9/2010 | Rabinovitch | G06F 9/3806 712/238 |
| 2013/0332712 A1* | 12/2013 | Bonanno | G06F 9/3806 712/238 |
| 2013/0332716 A1* | 12/2013 | Bonanno | G06F 9/3806 712/240 |

OTHER PUBLICATIONS

U.S. Appl. No. 14/969,391, filed Dec. 15, 2015, Entitled: Perceptron Branch Predictor With Virtualized Weights, First Named Inventor: James J. Bonanno.

U.S. Appl. No. 14/969,492, filed Dec. 15, 2015, Entitled: Auxiliary Branch Prediction With Usefulness Tracking, First Named Inventor: James J. Bonanno.

U.S. Appl. No. 14/969,535, filed Dec. 15, 2015, Entitled: Auxiliary Perceptron Branch Predictor With Magnitude Usage Limit, First Named Inventor: James J. Bonanno.

U.S. Appl. No. 15/194,898, filed Jun. 28, 2016, Entitled: Perceptron Branch Predictor With Virtualized Weights, First Named Inventor: James J. Bonanno.

* cited by examiner

AUXILIARY BRANCH PREDICTION WITH USEFULNESS TRACKING

DOMESTIC PRIORITY

This application is a continuation of U.S. patent application Ser. No. 14/969,492, filed Dec. 15, 2015, the disclosure of which is incorporated by reference herein in its entirety.

BACKGROUND

The present invention relates generally to computer processing systems, and more particularly to auxiliary branch prediction with usefulness tracking in a processing system.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register. A throughput penalty is incurred if a branch is mispredicted.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

According to one embodiment, a method for managing auxiliary branch prediction in a processing system including a primary branch predictor and an auxiliary branch predictor is provided. The method includes locating a congruence class of the auxiliary branch predictor based on receiving a primary branch predictor misprediction indicator corresponding to a mispredicted target address of the primary branch predictor. An entry is identified in the congruence class having an auxiliary usefulness level set to a least useful level with respect to one or more other entries of the congruence class. Auxiliary data corresponding to the mispredicted target address is installed into the entry. A protection limit of the entry is initialized to a non-zero value upon installing the auxiliary data. The protection limit of the entry is reset to the non-zero value based on determining that the auxiliary usefulness level of the entry exceeds a protection threshold. The entry is identified as unprotected based on having a zero value in the protection limit of the entry. The entry is identified as protected based on having the non-zero value in the protection limit of the entry. Based on preventing an install of a protected least useful entry, the protection limit of the protected least useful entry is decremented. The auxiliary usefulness level of the entry is reset to an initial value based on installing the auxiliary data.

According to another embodiment, a processing system for managing auxiliary branch prediction includes a primary branch predictor, an auxiliary branch predictor, and an auxiliary install and update controller. The primary branch predictor includes a plurality of primary branch prediction structures. The auxiliary branch predictor includes a plurality of congruence classes, where each of the congruence classes has a plurality of entries. The auxiliary install and update controller is operable to locate a congruence class of the auxiliary branch predictor based on receiving a primary branch predictor misprediction indicator corresponding to a mispredicted target address of the primary branch predictor. An entry is identified in the congruence class having an auxiliary usefulness level set to a least useful level with respect to one or more other entries of the congruence class. Auxiliary data corresponding to the mispredicted target address is installed into the entry. A protection limit of the entry is initialized to a non-zero value upon installing the auxiliary data. The protection limit of the entry is reset to the non-zero value based on determining that the auxiliary usefulness level of the entry exceeds a protection threshold. The entry is identified as unprotected based on having a zero value in the protection limit of the entry. The entry is identified as protected based on having the non-zero value in the protection limit of the entry. Based on preventing an install of a protected least useful entry, the protection limit of the protected least useful entry is decremented. The auxiliary usefulness level of the entry is reset to an initial value based on installing the auxiliary data.

According to a further embodiment, a computer program product is provided. The computer program product includes a computer readable storage medium having program instructions embodied therewith. The program instructions are executable by a processor including a primary branch predictor and an auxiliary branch predictor to cause the processor to locate a congruence class of the auxiliary branch predictor based on receiving a primary branch predictor misprediction indicator corresponding to a mispredicted target address of the primary branch predictor. An entry is identified in the congruence class having an auxiliary usefulness level set to a least useful level with respect to one or more other entries of the congruence class. Auxiliary data corresponding to the mispredicted target address is installed into the entry. A protection limit of the entry is initialized to a non-zero value upon installing the auxiliary data. The protection limit of the entry is reset to the non-zero value based on determining that the auxiliary usefulness level of the entry exceeds a protection threshold. The entry is identified as unprotected based on having a zero value in the protection limit of the entry. The entry is identified as protected based on having the non-zero value in the protection limit of the entry. Based on preventing an install of a protected least useful entry, the protection limit of the protected least useful entry is decremented. The auxiliary usefulness level of the entry is reset to an initial value based on installing the auxiliary data.

DETAILED DESCRIPTION

Embodiments provide auxiliary branch prediction with usefulness tracking. An auxiliary branch predictor can be implemented as a relatively small table (i.e., in terms of number of entries) of highly accurate branch predictors. Installation of entries into the auxiliary branch predictor can be managed to track which branches optimize performance based on usefulness tracking. In many workloads, a small subset of branch instruction addresses account for a large percentage of mispredicted branch outcomes. Embodiments dynamically identify branches which are frequently mispredicted by primary branch predictors and correctly predicted by the auxiliary branch predictor, keeping these branches in the auxiliary branch predictor. The remaining branches can be effectively predicted with other smaller primary branch predictor entries.

Figure 1:
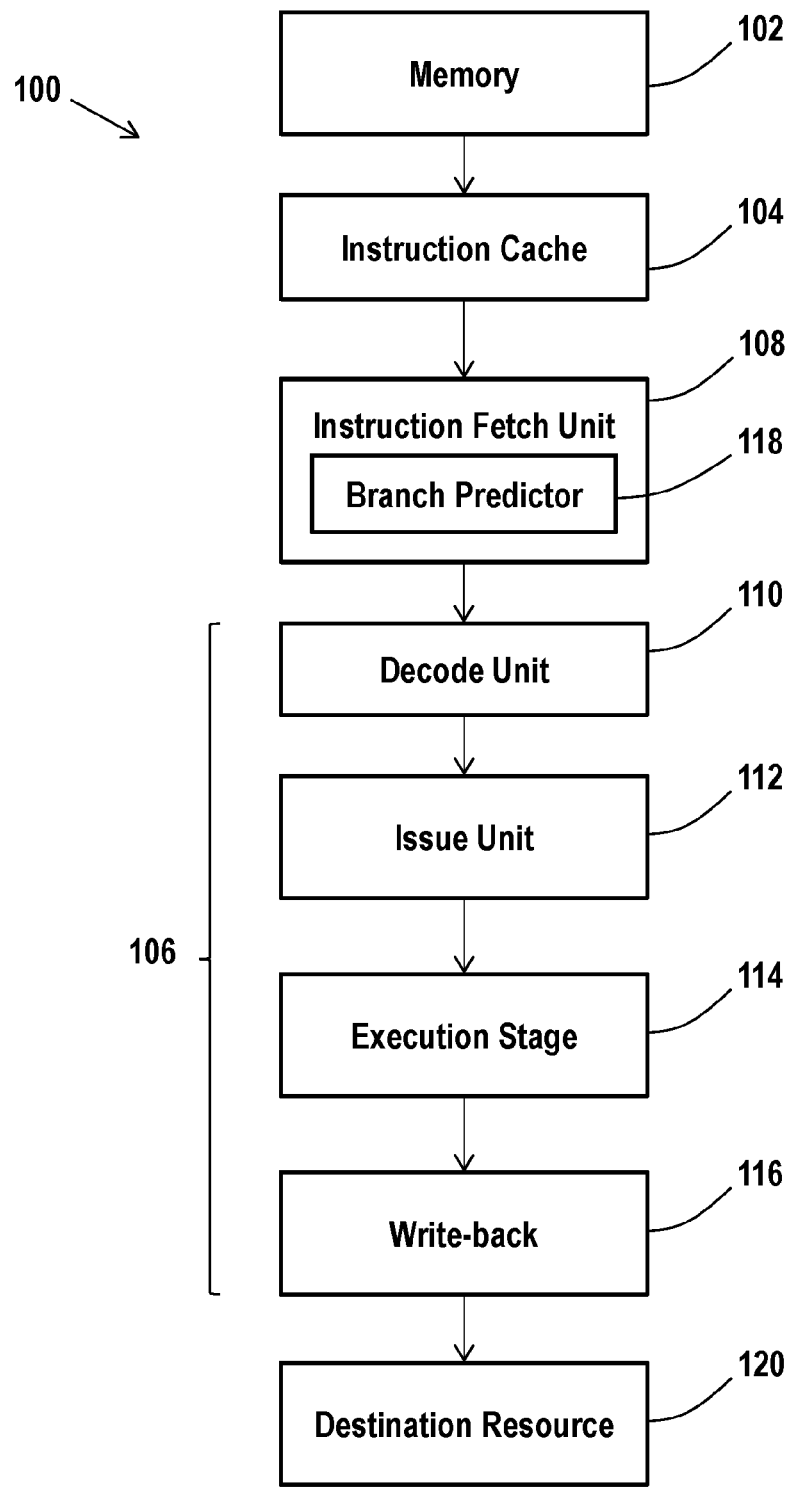
FIG. 1 illustrates a block diagram of a processing system in accordance with an embodiment.

FIG. 1 depicts a block diagram of a processing system 100 according to an embodiment. The processing system 100 includes a memory 102, an instruction cache 104, an instruction fetch unit 108, a branch predictor 118, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or nonvolatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes the branch predictor 118. Alternatively, the branch predictor 118 may be located separately from the instruction fetch unit 108. The instruction fetch unit 108 can also include other branch prediction logic (not depicted). The branch predictor 118 is an example of a processing circuit to implement auxiliary branch prediction with usefulness tracking.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
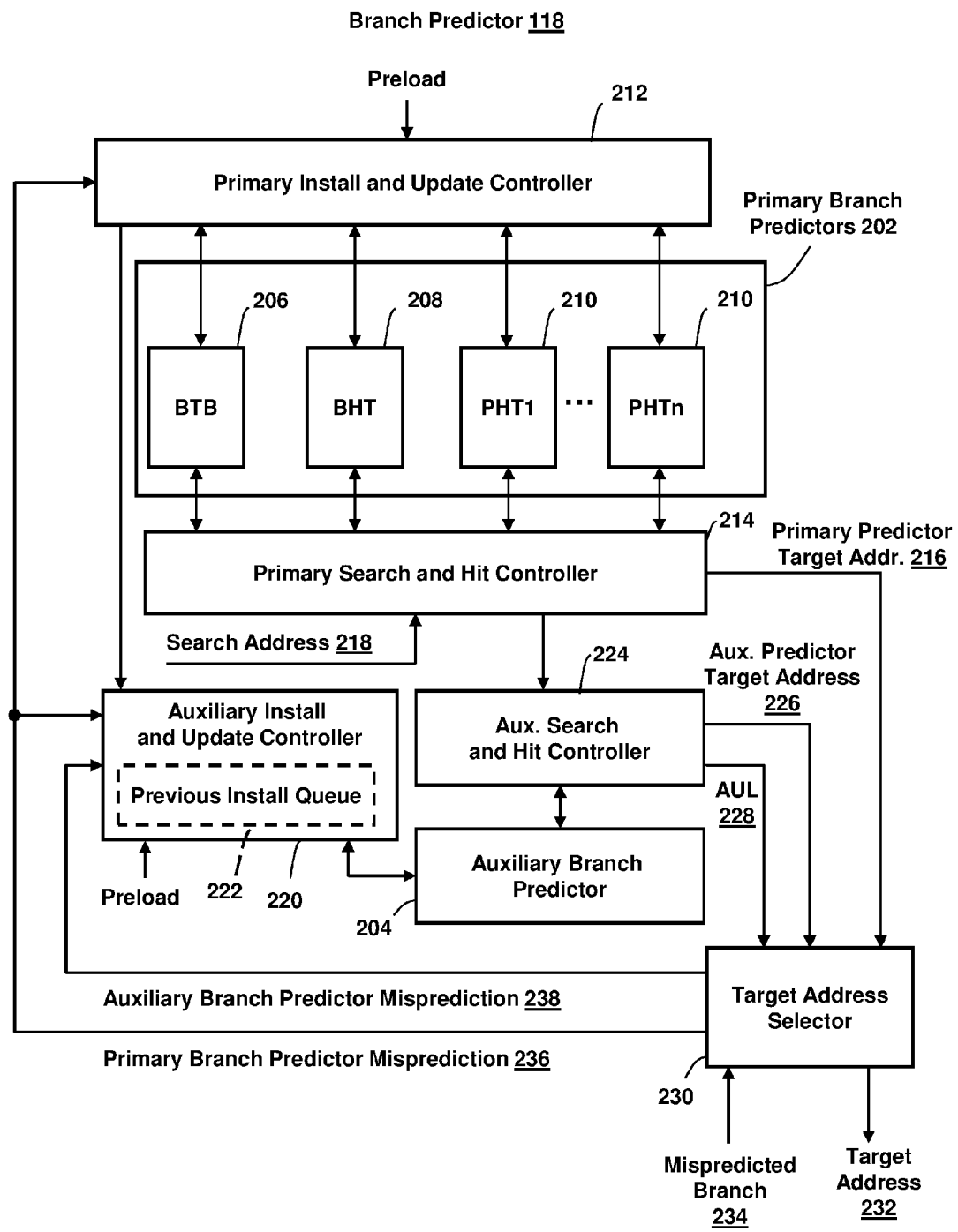
FIG. 2 depicts a branch predictor in accordance with an embodiment.

FIG. 2 depicts an example of the branch predictor 118 of FIG. 1 in greater detail. The example branch predictor 118 of FIG. 2 includes one or more primary branch predictors 202 and an auxiliary branch predictor 204. The primary branch predictors 202 can include any combination of primary branch prediction structures, such as a branch target buffer (BTB) 206, a branch history table (BHT) 208, and one or more pattern history tables (PHT) 210. The BTB 206 may be set associative and include multiple sets (columns) of BTB entries with each BTB entry including a branch address tag and a predicted target address, for example. The BHT 208 holds branch history information that indicates whether a branch is predicted as taken or not taken. The BHT 208 can also include prediction strength indicators for BHT direction predictions (e.g., strong not taken, weak not taken, weak taken, and strong taken). The BHT 204 may be indexed based on an instruction address. Each of the PHTs 210 can hold prediction strength indicators for PHT direction predictions and tags associated with branch prediction patterns. A depth (number of entries) of each PHT 210 may be adjusted based on observed recurring branch patterns or sequences observed in instructions processed by the processing system 100 of FIG. 1. Each PHT 210 may be accessed based on an index that is separately managed and adjusted. Indexing of each PHT 210 can be based on path history and a function of an instruction address, a global direction history vector, and/or a global taken path history vector.

The branch predictor 118 of FIG. 2 also includes a primary install and update controller 212 that controls installing and updating entries in the primary branch predictors 202. Although a single instance of the primary install and update controller 212 is depicted for the primary branch predictors 202, it will be understood that the primary install and update controller 212 can be subdivided to support one or more specific branch predictor types, i.e., to separately manage the BTB 206, BHT 208, and one or more PHT 210. The branch predictor 118 further includes a primary search and hit controller 214 that can search the primary branch prediction structures of the primary branch predictors 202 in parallel to determine a primary predictor target address 216, for instance, based on a search address 218 and/or corresponding indexing scheme.

Similarly, the branch predictor 118 can include an auxiliary install and update controller 220 operable to install and update entries in the auxiliary branch predictor 204. The auxiliary install and update controller 220 may use a previous install queue 222 to manage installs and avoid duplication of entries in the auxiliary branch predictor 204. An auxiliary search and hit controller 224 can search the auxiliary branch predictor 204 to determine an auxiliary predictor target address 226, for instance, based on the search address 218 and/or corresponding indexing scheme provided through the primary search and hit controller 214. The primary branch predictors 202 and the auxiliary branch predictor 204 can be searched in parallel, resulting in predictions that may differ from each other as the primary predictor target address 216 and the auxiliary predictor target address 226. The auxiliary branch predictor 204 can store an auxiliary usefulness level 228 with each of the entries. Upon the auxiliary search and hit controller 224 locating a hit in the auxiliary branch predictor 204 the auxiliary usefulness level 228 is provided that corresponds to the auxiliary predictor target address 226. A target address selector 230 can use the auxiliary usefulness level 228 to determine whether to select the primary predictor target address 216 or the auxiliary predictor target address 226 as a target address 232 result of the branch predictor 118.

The target address 232 can be used by the instruction fetch unit 108 of FIG. 1 to prefetch instructions. If it is later determined in the processing pipeline 106 of FIG. 1 that the target address 232 was mispredicted as an address misprediction and/or a direction misprediction (taken/not-taken), the branch predictor 118 receives an indicator of a mispredicted branch 234. Branch predictor 118 can predict the direction of a branch and if predicted taken, it can predict the target address 232 to which the branch proceeds. If a branch is predicted not-taken, the next sequential instruction address is the next instruction to fetch and execute and may also be referred to as a target address as used herein. The target address selector 230 or other logic of the branch predictor 118 can determine whether the mispredicted branch 234 was predicted by the primary branch predictors 202 or the auxiliary branch predictor 204. In embodiments, a misprediction indicator corresponding to a mispredicted target address indicates a target address misprediction and/or a direction misprediction, as a wrong direction prediction results in a wrong target address prediction. Embodiments of the auxiliary branch predictor 204 can be used for direction predictions and/or target address predictions.

A primary branch predictor misprediction indicator 236 can be provided to both the primary install and update controller 212 and the auxiliary install and update controller 220. The primary branch predictor misprediction indicator 236 can be used by the primary install and update controller 212 to update the contents of the primary branch predictors 202. An auxiliary branch predictor misprediction indicator 238 can be provided to the auxiliary install and update controller 220. Both the primary branch predictor misprediction indicator 236 and the auxiliary branch predictor misprediction indicator 238 can be used to update the contents of the auxiliary branch predictor 204 as further described herein. Further, a change to the contents of the primary branch predictors 202, such as invalidation of a BTB entry in the BTB 206 can be communicated from the primary install and update controller 212 to the auxiliary install and update controller 220, for instance to invalidate a referenced entry in the auxiliary branch predictor 204 or a portion (e.g., a record or all) of the previous install queue 222.

While the primary install and update controller 212 can use the primary branch predictor misprediction indicator 236 to trigger installs and updates to the primary branch predictors 202, the primary branch predictors 202 can be installed and/or updated based on other events, such as path history, taken/not taken indicators, and the like. The primary install and update controller 212 may also support preloading of one or more of the primary branch predictors 202, for instance, as part of restoring to a previously stored checkpoint, testing, or other purposes. Similarly, the auxiliary install and update controller 220 can use the primary branch predictor misprediction indicator 236 and the auxiliary branch predictor misprediction indicator 238 to trigger installs and updates to the auxiliary branch predictor 204, as well as other events, such as path history, taken/not taken indicators, and the like. The auxiliary install and update controller 220 may also support preloading of the auxiliary branch predictor 204, for instance, as part of restoring to a previously stored checkpoint, testing, or other purposes.

Figure 3:
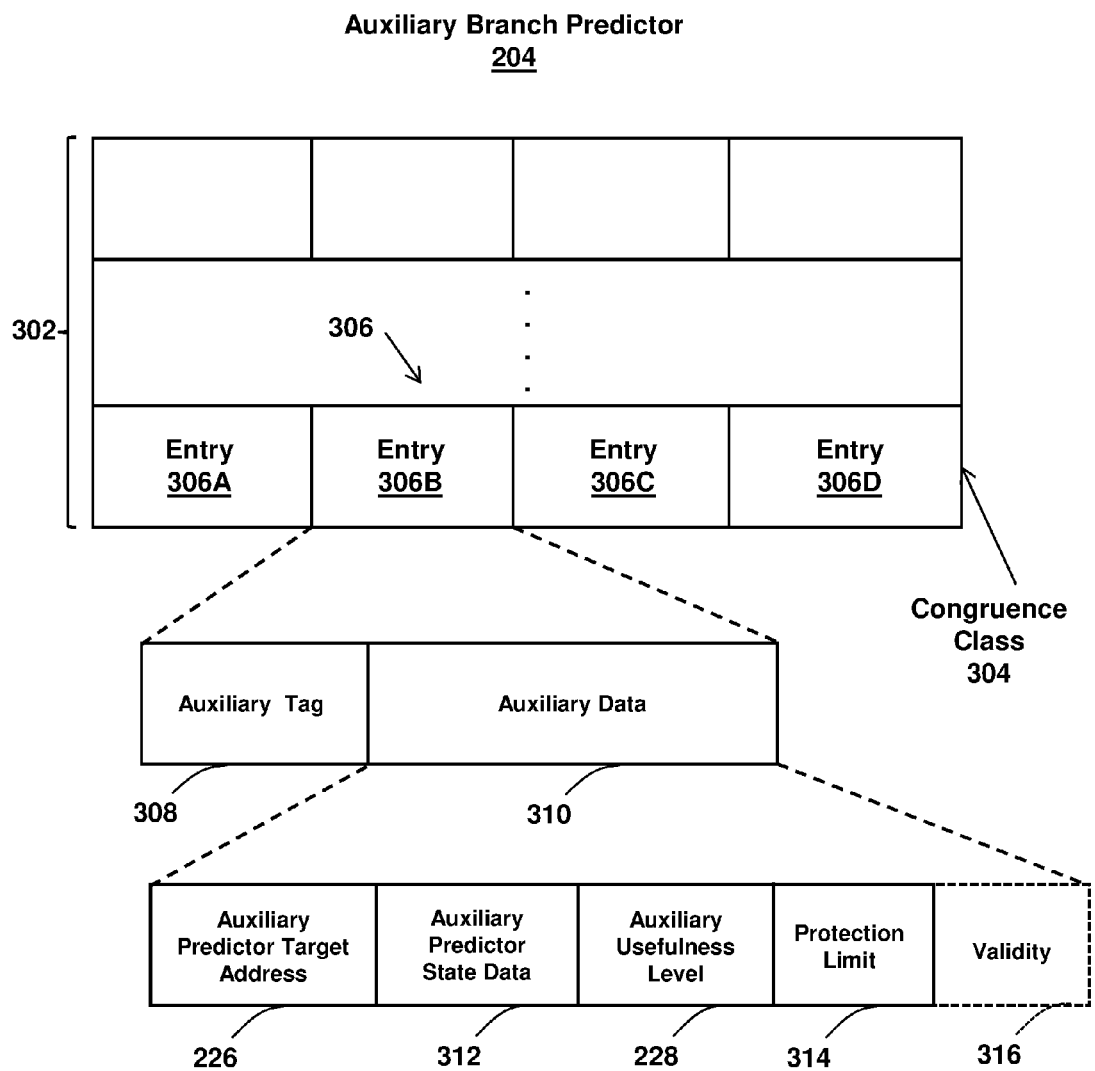
FIG. 3 depicts an auxiliary branch predictor in accordance with an embodiment.

The auxiliary branch predictor 204 can be structured as a tagged, set-associative table indexed by an instruction address (e.g., search address 218) and/or a global branch/path history (e.g., as used for indexing each PHT 210). An example structure of auxiliary branch predictor 204 is depicted in greater detail in FIG. 3. The auxiliary branch predictor 204 can include a plurality of congruence classes 302. The auxiliary install and update controller 220 and/or the auxiliary search and hit controller 224 can index to locate a particular congruence class 304 of the congruence classes 302, i.e., based on matching a subset of search address bits with an indexed position of the congruence class 304. Each of the congruence classes 302, including the congruence class 304, has a plurality of entries 306A-D. In the example of FIG. 3, congruence class 304 includes entry 306A, 306B, 306C, and 306D. Each entry 306 can include an auxiliary tag 308 and auxiliary data 310. The auxiliary tag 308 includes a portion of bits to map to a specific indexed/addressed position in combination with the position of the congruence class 304.

As one example, an address of an instruction fetched by the instruction fetch unit 108 of FIG. 1 is used as an initial value of search address 218 of FIG. 2 to access the branch predictor 118 and predict a branch target address. When looking for auxiliary branch predictions, the auxiliary branch predictor 204 is read and can provide an auxiliary predictor target address 226 if the auxiliary branch predictor 204 contains an entry 306 with an auxiliary tag 308 matching a portion of the search address 218. The auxiliary branch predictor 204 provides input to the auxiliary search and hit controller 224 to determine whether a match or "hit" is located. If a match is found, the auxiliary search and hit controller 224 outputs auxiliary predictor target address 226 along with an associated value of the auxiliary usefulness level 228 from the same entry 306. The auxiliary predictor target address 226 stored in the auxiliary branch predictor 204 may only include a subset of address bits which can expanded to include additional address bits by the auxiliary search and hit controller 224 and/or the target address selector 230.

Each auxiliary predictor entry 306 can also include one or multiple highly accurate branch predictors, such as a perceptron (i.e., machine learning) predictor, local history table, or complex state machine in auxiliary predictor state data 312. A large volume of data per entry 306 may be needed to support complex prediction algorithms. As such, the auxiliary branch predictor 204 typically includes much fewer total entries as compared to the number of entries in the BTB 206, which can use a simple branch address tag and target format known in the art. In the example of FIG. 3, the auxiliary data 310 in each entry 306 includes a protection limit 314 and may also include validity 316.

In an embodiment, the auxiliary install and update controller 220 attempts to install an entry 306 into the auxiliary branch predictor 204 when there is a misprediction by the primary branch predictors 202. Within a congruence class 304, the auxiliary install and update controller 220 determines which, if any, existing entry 306 in the congruence class 304 to replace according to a replacement policy. An attempted install may not succeed if the replacement policy determines that it is likely better for performance to protect all the existing entries 306A-D in the congruence class 304 from being replaced.

In an embodiment, upon trying to install, the replacement policy of the auxiliary install and update controller 220 is to replace an invalid entry if there is one in the congruence class 304 as indicated by validity 316. Otherwise, the auxiliary install and update controller 220 replaces the least useful entry (i.e., having a lowest auxiliary usefulness level 228 in entries 306A-D of congruence class 304) if the least useful entry is not being protected (e.g., having a protection limit 314 of zero). Upon installing an entry 306, the auxiliary usefulness level 228 can be set to a low initial value (for example to 1). The auxiliary usefulness level 228 of the entry 306 can be increased whenever primary branch predictors 202 were wrong (e.g., primary branch predictor misprediction indicator 236 is set), and either the prediction from the auxiliary branch predictor 204 was correct (e.g., auxiliary branch predictor misprediction indicator 238 is clear) or the entry 306 of the auxiliary branch predictor 204 has not been trained enough (e.g., auxiliary usefulness level 228 is below a training threshold). Upon incrementing the auxiliary usefulness level 228 such that all entries 306A-306D in the same congruence class 304 have auxiliary usefulness levels above a reduction threshold, the auxiliary usefulness level 228 for all entries 306A-D in the congruence class 304 can be reduced (e.g., divide auxiliary usefulness level 228 by two in entries 306A-D in the congruence class 304). This ensures the auxiliary usefulness levels 228 in congruence class 304 accurately represent the relative usefulness of the entries 306A-306D and do not all saturate at a maximum value. Similarly, dividing the auxiliary usefulness level 228 in entries 306A-D in the congruence class 304 by two once two entries 306 in the congruence class 304 reach the maximum value can also be used to maintain relative usefulness of the entries 306A-306D.

The protection limit 314 can be used to protect newly installed entries 306 from being replaced before the predictor associated with auxiliary predictor state data 312 has been trained and auxiliary usefulness level 228 has been determined. The protection limit 314 also protects entries 306 known to be recently useful from being replaced. Upon being installed in an entry 306 of the auxiliary branch predictor 204, the protection limit 314 can be initialized to a nonzero value. Upon incrementing auxiliary usefulness limit 228 above a protection threshold, the protection limit 314 can be re-initialized to a nonzero value. The initialization values in the two cases do not necessarily need to be the same non-zero value. Upon trying to install a new entry into the auxiliary branch predictor 204, if the least useful entry (e.g., entry 306A-306D having a lowest auxiliary usefulness limit 228) has a protection limit 314 of zero, the install is allowed to proceed. If the protection limit 314 of the least useful entry is non-zero, the protection limit 314 is decreased, and the new install is prevented.

In addition to the auxiliary usefulness level 228 affecting the replacement policy, the auxiliary usefulness level 228 can also affect whether or not the prediction from the auxiliary branch predictor 204 is used. For example, with a 5-bit auxiliary usefulness level 228, if the value is between 0 and 7, the auxiliary predictor target address 226 may not be used, but the predictor associated with auxiliary state data 312 can be trained. If the value of the auxiliary usefulness level 228 is between 8 and 31, the auxiliary predictor target address 226 may be selected for use by the target address selector 230 as the target address 232 rather than selecting the primary predictor target address 216. Continuing with this example, once all entries 306A-D in the congruence class 304 have (or would have) auxiliary usefulness level 228 values in the range 16-31, the values can all be reduced by half (e.g., divide by two using a shift operation). Once two entries in the congruence class 304 have (or would have) auxiliary usefulness level 228 values of 31, the auxiliary usefulness level 228 values in all entries 306A-D in the congruence class 304 can be reduced by half (e.g., divide by two using a shift operation).

The update policy for the auxiliary branch predictor 204 depends on the choice of the auxiliary predictors. For example, for a perceptron predictor, the policy may be to update the entry 306 whenever a match occurred with the auxiliary branch predictor 204 even if the auxiliary data 310 was not used to make the prediction due to a low value in the auxiliary usefulness level 228. For a perceptron predictor, an update can be done if the perceptron's prediction did not match the branch outcome, or the perceptron prediction did match the branch outcome but the magnitude of the prediction (i.e., prediction strength) was below a confidence threshold.

Figure 4:
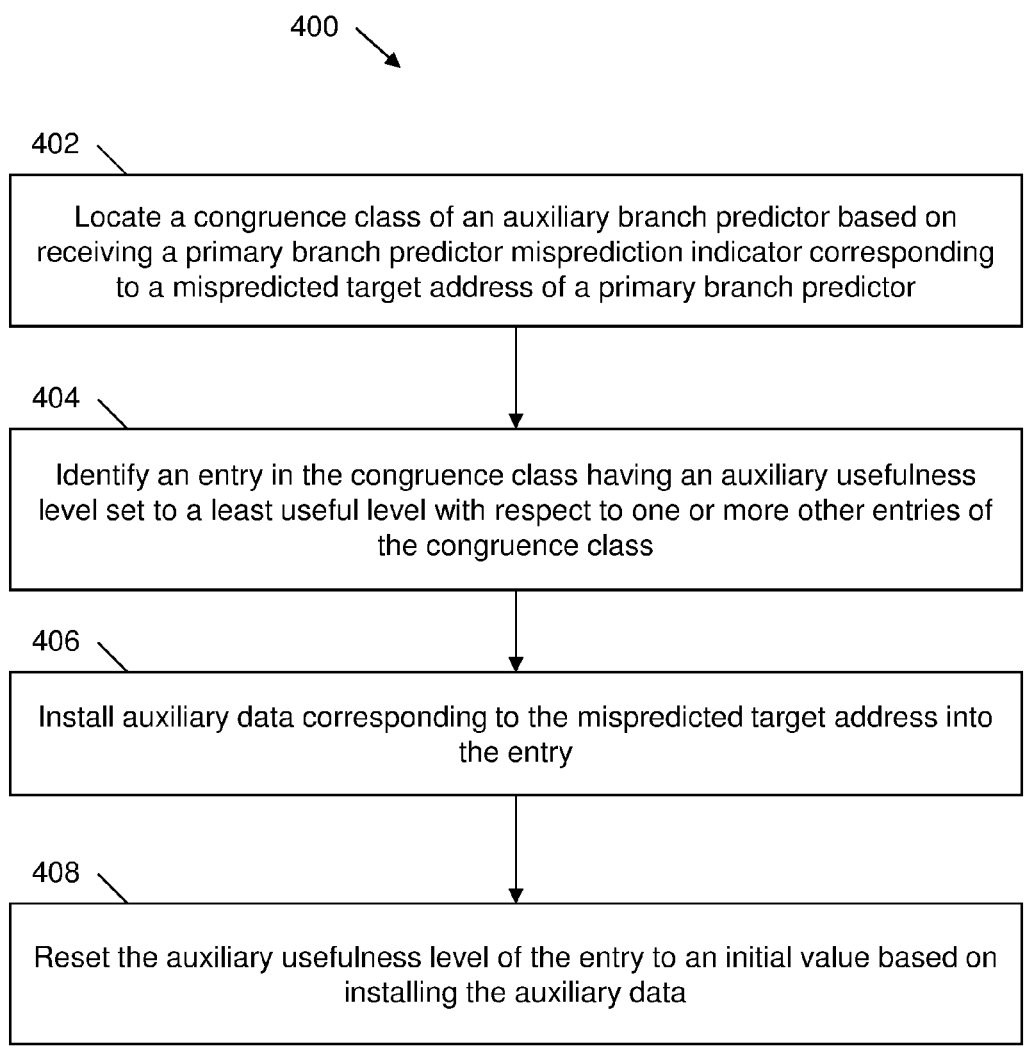
FIG. 4 is a process flow diagram for managing auxiliary branch prediction in a processing system in accordance with an embodiment.

FIG. 4 depicts a high-level process flow diagram for managing auxiliary branch prediction in a processing system in accordance with an embodiment. Process 400 of FIG. 4 is a method that can be performed by the auxiliary install and update controller 220 of FIG. 2 and/or other elements of branch predictor 118 of FIGS. 1 and 2. For ease of explanation, process 400 is described in reference to the branch predictor 118 of the processing system 100 of FIGS. 1 and 2 and in further reference to FIG. 3.

At block 402, the auxiliary install and update controller 220 locates a congruence class 304 of the auxiliary branch predictor 204 based on receiving a primary branch predictor misprediction indicator 236 corresponding to a mispredicted target address of a primary branch predictor 202. The target address selector 230 may track whether the primary predictor target address 216 or the auxiliary predictor target address 226 was selected as target address 232 to assist in identifying whether a mispredicted branch 234 originated from the primary branch predictors 202 or auxiliary branch predictor 204. For instance, if the primary predictor target address 216 was used as the target address 232, if upon resolving the actual address, the processing pipeline 106 determines that a misprediction occurred, the processing pipeline 106 can generate an indication of the mispredicted branch 234. Upon receiving an indication of the mispredicted branch 234 associated with the primary predictor target address 216, the target address selector 230 may set the primary branch predictor misprediction indicator 236. The primary branch predictor misprediction indicator 236 and/or other signals can be used to indicate that the primary branch predictors 202 were correct or incorrect in making a branch prediction. Similarly, the auxiliary branch predictor misprediction indicator 238 and/or other signals can be used to indicate that the auxiliary branch predictor 204 was correct or incorrect in making a branch prediction.

At block 404, the auxiliary install and update controller 220 identifies an entry 306 in the congruence class 304 having an auxiliary usefulness level 228 set to a least useful level with respect to one or more other entries 306 of the congruence class 304. For example, if entry 306B had an auxiliary usefulness level 228 of zero in congruence class 304 and entries 306A, 306C, and 306D in congruence class 304 had an auxiliary usefulness level 228 of greater than zero, then entry 306B would be identified as being set to the least useful level.

The auxiliary install and update controller 220 may also inspect the protection limit 314 and/or validity 316 of entries 306A-D of congruence class 304 to select the entry 306. The auxiliary install and update controller 220 can check a protection limit 314 of each of the entries 306A-D in the congruence class 304 that identifies whether each of the entries 306A-D is protected or unprotected from being overwritten. The auxiliary install and update controller 220 can identify the entry 306 in the congruence class 304 having the auxiliary usefulness level 228 set to the least useful level of the entries 306A-D in the congruence class 304 that are unprotected. When validity 316 is included, the auxiliary install and update controller 220 can check the congruence class 304 for an invalid entry, and based on locating an invalid entry in the congruence class 304, the invalid entry is selected as the entry 306 for updating. Based on determining that no invalid entries exist in the congruence class 304, the entry 306 in the congruence class 304 having the auxiliary usefulness level 228 set to the least useful level is selected.

At block 406, the auxiliary install and update controller 220 installs auxiliary data 310 corresponding to the mispredicted target address into the entry 306. For example, a portion of the mispredicted target address can be written to auxiliary predictor target address 226 at the entry 306, and congruence class 304 can be indexed by the address of the mispredicted branch 234. To avoid duplication in the auxiliary branch predictor 204, records of a plurality of recently successful installs into the auxiliary branch predictor 204 can be stored in the previous install queue 222. A new install into the auxiliary branch predictor 204 may be prevented based on locating a matching record in the previous install queue 222. The previous install queue 222 can be invalidated after a queue refresh period has elapsed.

At block 408, the auxiliary install and update controller 220 resets the auxiliary usefulness level 228 of the entry 306 to an initial value based on installing the auxiliary data 310. As one example, the auxiliary usefulness level 228 can be set to a value of zero or one to indicate low usefulness until further iterations confirm and increment the auxiliary usefulness level 228 of the entry 306. Upon an installation, validity 316 of the entry 306 can be set to valid.

In embodiments where the auxiliary branch predictor 204 is configured to be a subset of one of the primary branch predictors 202, such as BTB 206, the auxiliary tag 308 can be linked to a BTB tag. For example, a column within a congruence class in the BTB 206 can be stored as an auxiliary tag 308 in the auxiliary branch predictor 204. When a BTB entry is overwritten in BTB 206, the primary install and update controller 212 may trigger the auxiliary install and update controller 220 to invalidate the entry 306 that references the BTB entry to avoid "orphan" auxiliary entries. This is referred to as "orphan invalidation". Upon orphan invalidation, the auxiliary install and update controller 220 can also invalidate an affected record of the previous install queue 222 or the entire previous install queue 222. Thus, the auxiliary install and update controller 220 can invalidate a referenced entry in the auxiliary branch predictor 204 based on determining that a referencing entry of the primary branch predictor 202 has been invalidated, where the referencing entry in the primary branch predictor 202 corresponds to the referenced entry in the auxiliary branch predictor 204. Invalidation of a record of the referenced entry in the previous install queue 222 or completely invalidating the previous install queue 222 may be performed based on invalidating the referenced entry in the auxiliary branch predictor 204.

Figure 5:
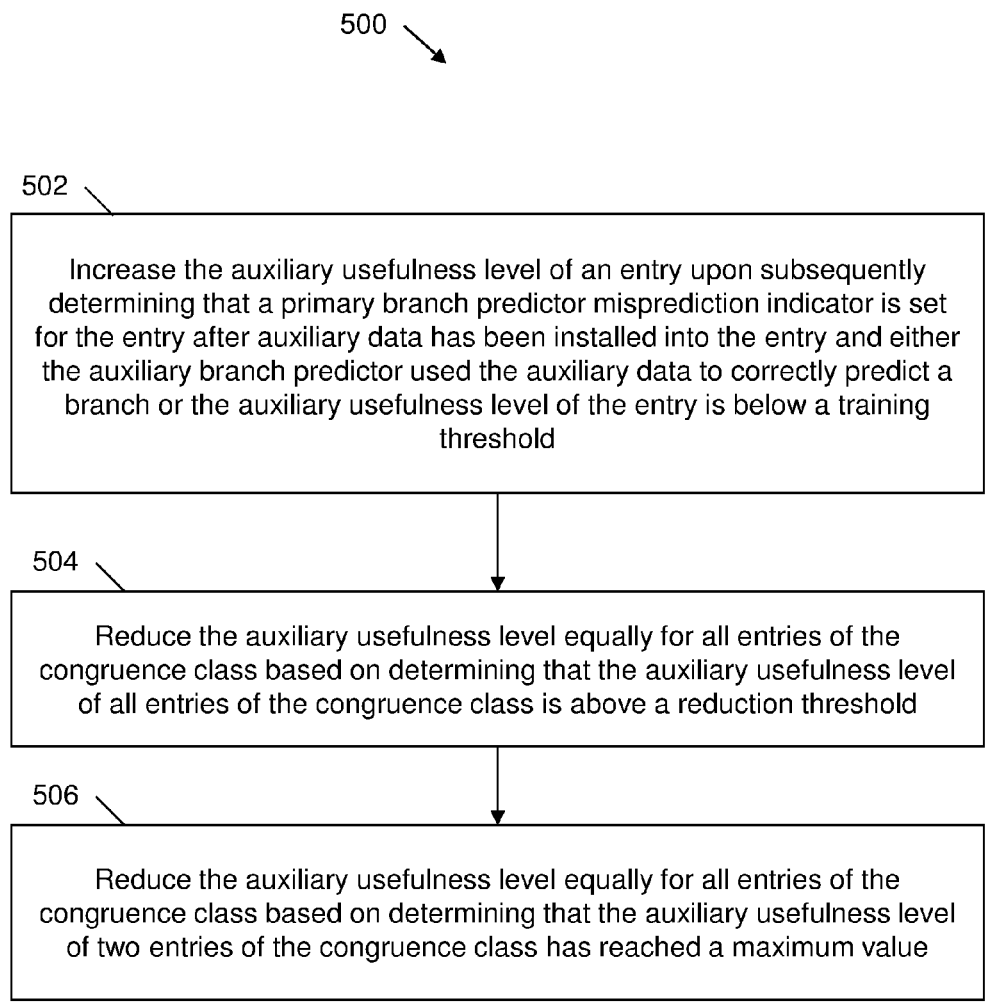
FIG. 5 is a process flow diagram of auxiliary usefulness level management for an auxiliary branch predictor in accordance with an embodiment.

FIG. 5 is a process flow diagram of auxiliary usefulness level management for auxiliary branch predictor 204 of FIG. 2. Process 500 of FIG. 5 is a method that can be performed by the auxiliary install and update controller 220 of FIG. 2 and/or other elements of branch predictor 118 of FIGS. 1 and 2. For ease of explanation, process 500 is described in reference to the branch predictor 118 of the processing system 100 of FIGS. 1 and 2 and in further reference to FIG. 3.

At block 502, the auxiliary install and update controller 220 can increase the auxiliary usefulness level 228 of an entry 306 in congruence class 304 upon subsequently determining that the primary branch predictor misprediction indicator 236 is set for the entry 306 after the auxiliary data 310 has been installed into the entry 306, and either the auxiliary branch predictor 204 used the auxiliary data 310 to correctly predict a branch or the auxiliary usefulness level 228 of the entry 306 is below a training threshold. A misprediction by one of the primary branch predictors 202 and a correct prediction by the auxiliary branch predictor 202 indicate that the auxiliary branch predictor 202 is more likely to be useful than primary branch predictors 202 for a particular prediction. The training threshold allows further iterations for the auxiliary branch predictor 204 to continue learning even if the current prediction was incorrect.

At block 504, the auxiliary install and update controller 220 reduces the auxiliary usefulness level 228 equally for all entries 306A-D of the congruence class 304 based on determining that the auxiliary usefulness level 228 of all entries 306A-D of the congruence class 304 is above a reduction threshold.

At block 506, the auxiliary install and update controller 220 reduces the auxiliary usefulness level 228 equally for all entries 306A-D of the congruence class 304 based on determining that the auxiliary usefulness level 228 of two entries 306 of the congruence class 304 has reached a maximum value.

Figure 6:
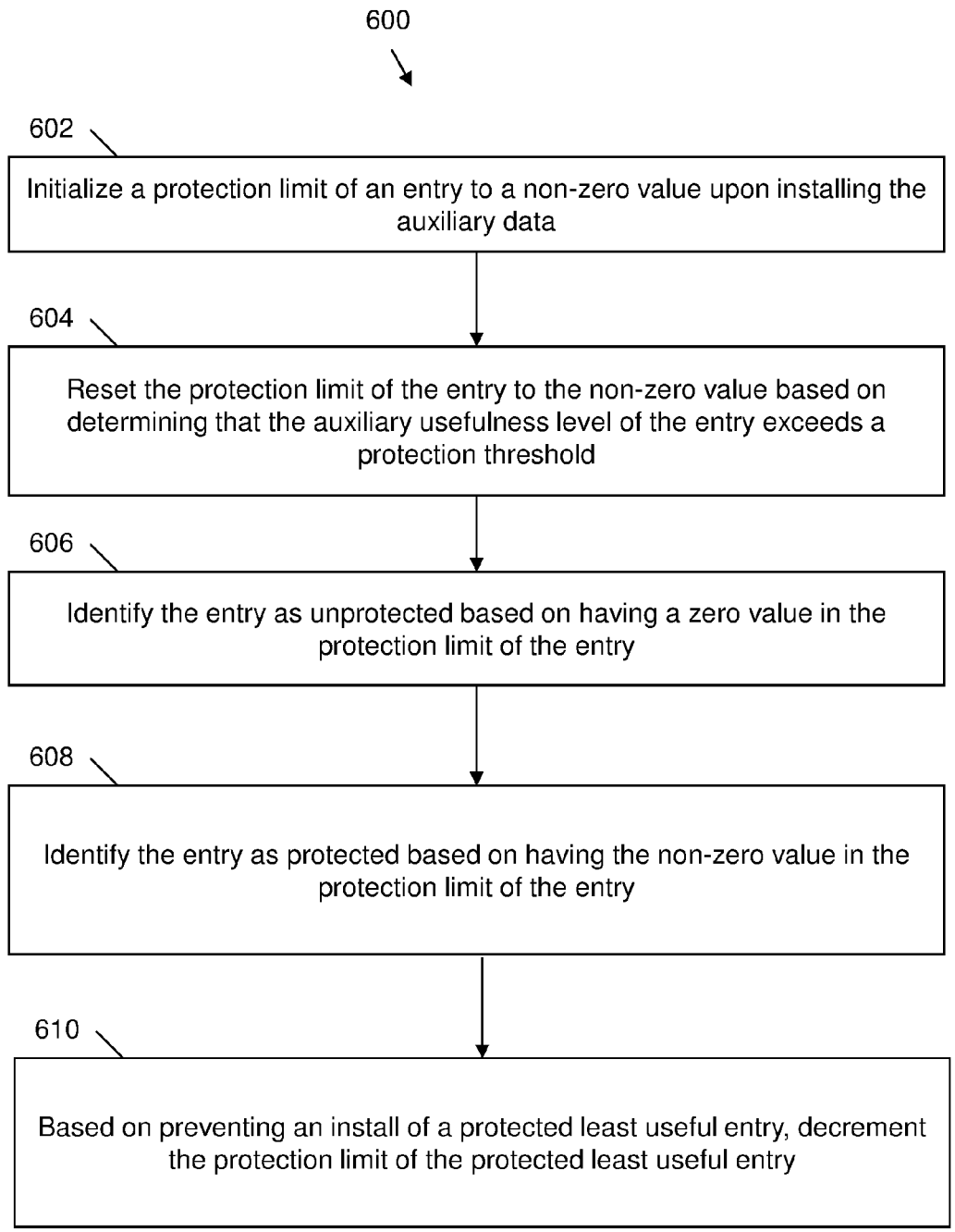
FIG. 6 is a process flow diagram of protection limit management for an auxiliary branch predictor in accordance with an embodiment.

FIG. 6 is a process flow diagram of protection limit management for auxiliary branch predictor 204 of FIG. 2. Process 600 of FIG. 6 is a method that can be performed by the auxiliary install and update controller 220 of FIG. 2 and/or other elements of branch predictor 118 of FIGS. 1 and 2. For ease of explanation, process 600 is described in reference to the branch predictor 118 of the processing system 100 of FIGS. 1 and 2 and in further reference to FIG. 3

At block 602, the auxiliary install and update controller 220 initializes the protection limit 314 of the entry 306 to a non-zero value upon installing the auxiliary data 310.

At block 604, the auxiliary install and update controller 220 resets the protection limit 314 of the entry 306 to the non-zero value based on determining that the auxiliary usefulness level 228 of the entry 306 exceeds a protection threshold.

At block 606, the auxiliary install and update controller 220 identifies the entry 306 as unprotected based on having a zero value in the protection limit 314 of the entry 306.

At block 608, the auxiliary install and update controller 220 identifies the entry 306 as protected based on having the non-zero value in the protection limit 314 of the entry 306.

At block 610, the auxiliary install and update controller 220 decrements the protection limit 314 of the protected least useful entry based on preventing an install of a protected least useful entry.

Figure 7:
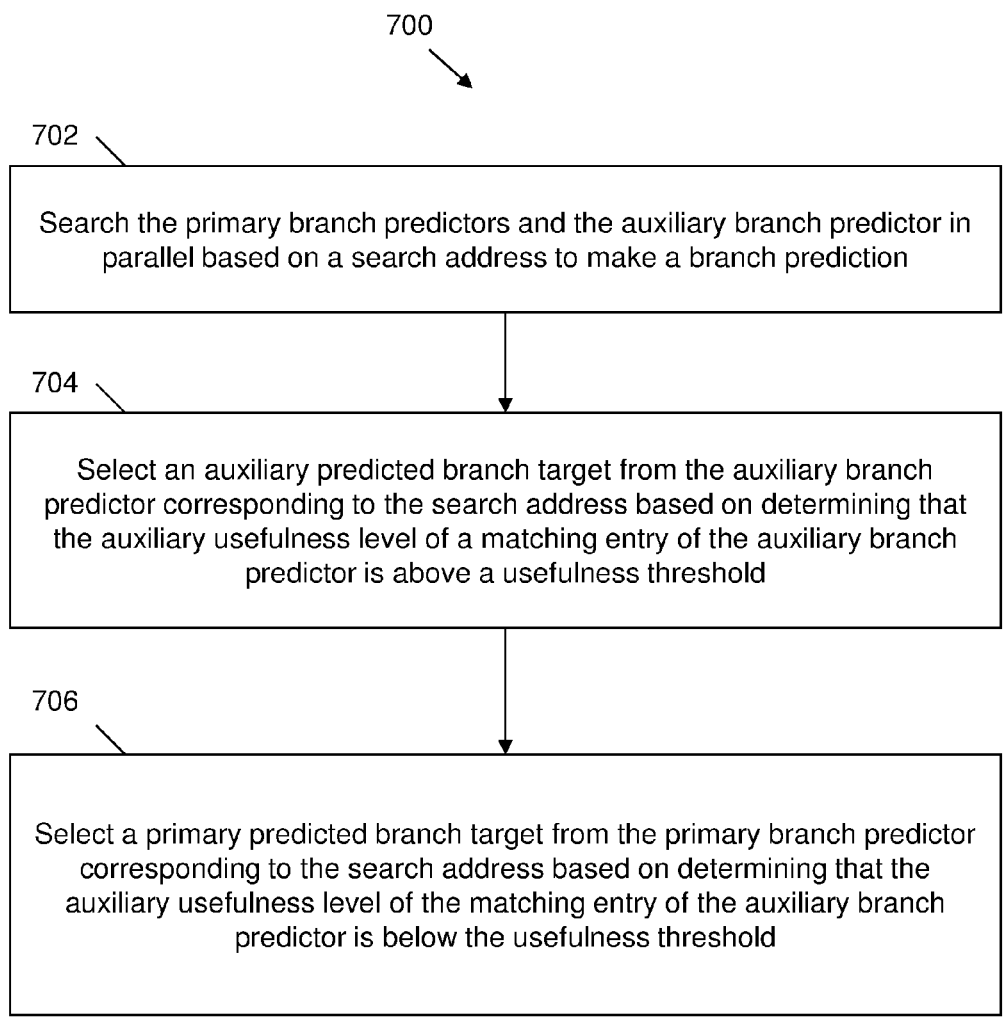
FIG. 7 is a process flow diagram for target address selection in accordance with an embodiment.

FIG. 7 is a process flow diagram for target address selection. Process 700 of FIG. 7 is a method that can be performed by the branch predictor 118 of FIGS. 1 and 2. For ease of explanation, process 700 is described in reference to the branch predictor 118 of the processing system 100 of FIGS. 1 and 2 and in further reference to FIG. 3.

At block 702, the primary branch predictors 202 and the auxiliary branch predictor 204 are searched in parallel based on a search address 218 to make a branch prediction. The primary search and hit controller 214 can search primary branch prediction structures of the primary branch predictors 202 while the auxiliary search and hit controller 224 searches the auxiliary branch predictor 204. A resulting value of the primary predictor target address 216 is provided from the primary search and hit controller 214 to the target address selector 230. Resulting values of the auxiliary predictor target address 226 and auxiliary usefulness level 228 can be provided to the target address selector 230.

At block 704, the target address selector 230 selects an auxiliary predictor branch target 226 from the auxiliary branch predictor 204 corresponding to the search address 218 based on determining that the auxiliary usefulness level 228 of a matching entry 306 of the auxiliary branch predictor 204 is above a usefulness threshold.

At block 706, the target address selector 230 selects a primary predictor branch target 216 from the primary branch predictors 202 corresponding to the search address 218 based on determining that the auxiliary usefulness level 228 of the matching entry 306 of the auxiliary branch predictor 204 is below the usefulness threshold.

Figure 8:
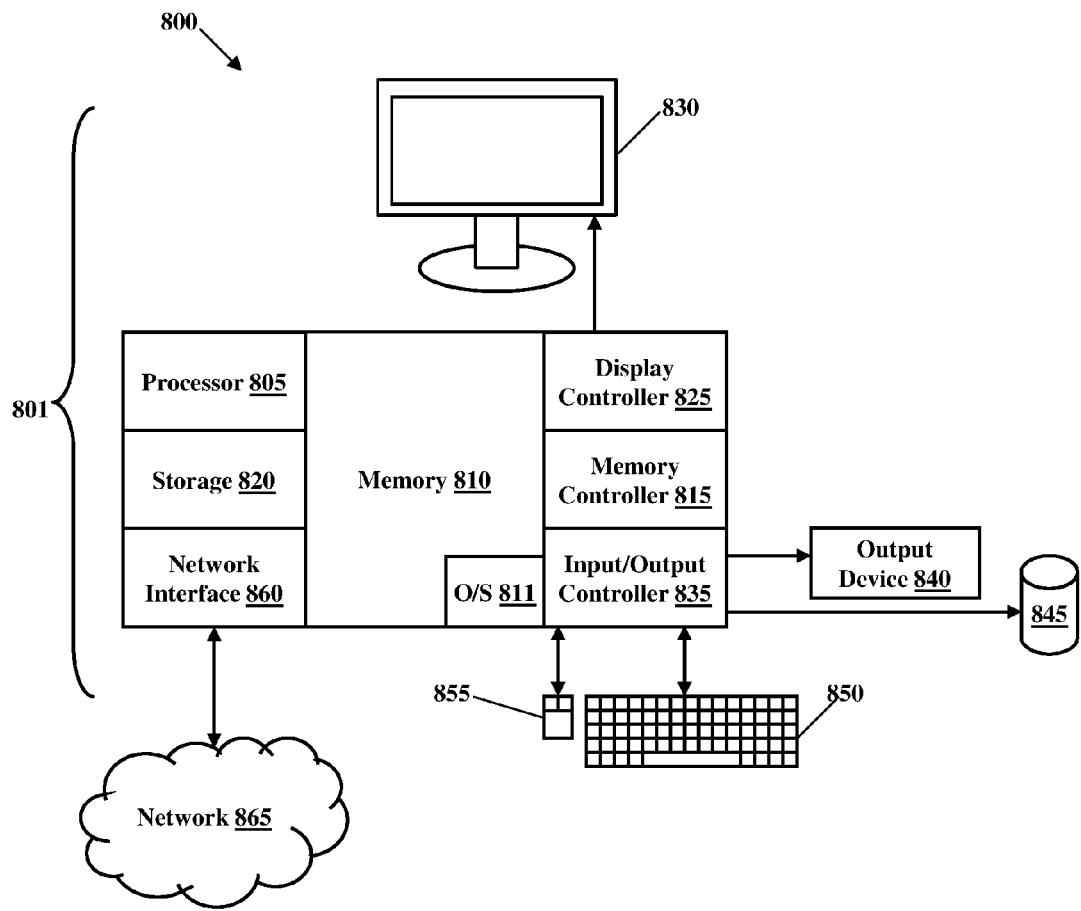
FIG. 8 is a computing system according to an embodiment.

FIG. 8 depicts a block diagram of a system 800 for auxiliary branch prediction with usefulness tracking in a processor 805. The methods described herein can be implemented in hardware, software (e.g., firmware), or a combination thereof. In an exemplary embodiment, the methods described herein are implemented in hardware as part of the microprocessor of a computer, such as a personal computer, workstation, minicomputer, or mainframe computer. The system 800 therefore includes computer 801 as illustrated in FIG. 8.

In an exemplary embodiment, in terms of hardware architecture, as shown in FIG. 8, the computer 801 includes a processor 805 which is a processing circuit that includes the processing pipeline 106 of FIG. 1 and branch predictor 118. The computer 801 further includes memory 810 coupled to a memory controller 815, and one or more input and/or output (I/O) devices 840, 845 (or peripherals) that are communicatively coupled via a local input/output controller 835. The input/output controller 835 can be, for example but not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 805 is a hardware device for executing software, particularly that stored in storage 820, such as cache storage, or memory 810. The processor 805 can be any custom made or commercially available processor, a central processing unit (CPU), an auxiliary processor among several processors associated with the computer 801, a semiconductor based microprocessor (in the form of a microchip or chip set), a macroprocessor, or generally any device for executing instructions.

The memory 810 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 810 may incorporate electronic, magnetic, optical, and/or other types of storage media. Note that the memory 810 can have a distributed architecture, where various components are situated remote from one another, but can be accessed by the processor 805.

The instructions in memory 810 may include one or more separate programs, each of which comprises an ordered listing of executable instructions for implementing logical functions. In the example of FIG. 8, the instructions in the memory 810 a suitable operating system (OS) 811. The operating system 811 essentially controls the execution of other computer programs and provides scheduling, input-output control, file and data management, memory management, and communication control and related services.

In an exemplary embodiment, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 800 can further include a display controller 825 coupled to a display 830. In an exemplary embodiment, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In an exemplary embodiment, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 801 is a PC, workstation, intelligent device or the like, the instructions in the memory 810 may further include a basic input output system (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to fetch and execute instructions stored within the memory 810, to communicate data to and from the memory 810, and to generally control operations of the computer 801 pursuant to the instructions.

In an exemplary embodiment, where the branch predictor 118 of FIG. 2 is implemented in hardware, the methods described herein, such as processes 400-700 of FIGS. 4-7, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include achieving increased branch prediction accuracy in an efficient manner by allocating branch predictor entries in an auxiliary branch predictor for a small subset of branches that most benefit from the auxiliary branch predictor's increased complexity predictions. Usefulness tracking enables efficient selection between primary branch predictor results and auxiliary branch predictor results. Protection limits enable a training period for auxiliary branch predictors that use machine learning algorithms.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for managing auxiliary branch prediction in a processing system comprising a primary branch predictor and an auxiliary branch predictor, the method comprising:
    locating a congruence class of the auxiliary branch predictor based on receiving a primary branch predictor misprediction indicator corresponding to a mispredicted target address of the primary branch predictor;
    identifying an entry in the congruence class having an auxiliary usefulness level set to a least useful level with respect to one or more other entries of the congruence class;
    installing auxiliary data corresponding to the mispredicted target address into the entry;
    initializing a protection limit of the entry to a non-zero value upon installing the auxiliary data;
    resetting the protection limit of the entry to the non-zero value based on determining that the auxiliary usefulness level of the entry exceeds a protection threshold;
    identifying the entry as unprotected based on having a zero value in the protection limit of the entry;
    identifying the entry as protected based on having the non-zero value in the protection limit of the entry;
    based on preventing an install of a protected least useful entry, decrementing the protection limit of the protected least useful entry; and
    resetting the auxiliary usefulness level of the entry to an initial value based on installing the auxiliary data.

2. The method of claim 1, further comprising:
    increasing the auxiliary usefulness level of the entry upon subsequently determining that the primary branch predictor misprediction indicator is set for the entry after the auxiliary data has been installed into the entry, and either the auxiliary branch predictor used the auxiliary data to correctly predict a branch or the auxiliary usefulness level of the entry is below a training threshold;
    reducing the auxiliary usefulness level equally for all entries of the congruence class based on determining that the auxiliary usefulness level of all entries of the congruence class is above a reduction threshold; and
    reducing the auxiliary usefulness level equally for all entries of the congruence class based on determining that the auxiliary usefulness level of two entries of the congruence class has reached a maximum value.

3. The method of claim 2, further comprising:
    searching the primary branch predictor and the auxiliary branch predictor in parallel based on a search address to make a branch prediction;
    selecting an auxiliary predictor branch target from the auxiliary branch predictor corresponding to the search address based on determining that the auxiliary usefulness level of a matching entry of the auxiliary branch predictor is above a usefulness threshold; and
    selecting a primary predictor branch target from the primary branch predictor corresponding to the search address based on determining that the auxiliary usefulness level of the matching entry of the auxiliary branch predictor is below the usefulness threshold.

4. The method of claim 1, wherein identifying the entry in the congruence class further comprises:
    checking the protection limit of each of a plurality of entries in the congruence class that identifies whether each of the entries is protected or unprotected from being overwritten; and identifying the entry in the congruence class having the auxiliary usefulness level set to the least useful level of the entries in the congruence class that are unprotected.

5. The method of claim 4, wherein identifying the entry in the congruence class further comprises:
checking the congruence class for an invalid entry;
based on locating the invalid entry in the congruence class, identifying the invalid entry as the entry for updating and setting a validity of the entry to valid; and
based on determining that no invalid entries exist in the congruence class, identifying the entry in the congruence class having the auxiliary usefulness level set to the least useful level with respect to one or more other entries of the congruence class.

6. The method of claim 1, further comprising:
storing records of a plurality of recently successful installs into the auxiliary branch predictor in a previous install queue;
preventing a new install into the auxiliary branch predictor based on locating a matching record in the previous install queue; and
invalidating the previous install queue after a queue refresh period has elapsed.

7. The method of claim 6, further comprising:
invalidating a referenced entry in the auxiliary branch predictor based on determining that a referencing entry in the primary branch predictor has been invalidated, wherein the referencing entry in the primary branch predictor corresponds to the referenced entry in the auxiliary branch predictor; and
invalidating a record of the referenced entry in the previous install queue or completely invalidating the previous install queue based on invalidating the referenced entry in the auxiliary branch predictor.

8. A processing system for managing auxiliary branch prediction, the processing system comprising:
a primary branch predictor comprising a plurality of primary branch prediction structures;
an auxiliary branch predictor comprising a plurality of congruence classes, each of the congruence classes comprising a plurality of entries; and
an auxiliary install and update controller operable to perform:
locating a congruence class of the auxiliary branch predictor based on receiving a primary branch predictor misprediction indicator corresponding to a mispredicted target address of the primary branch predictor;
identifying an entry in the congruence class having an auxiliary usefulness level set to a least useful level with respect to one or more other entries of the congruence class;
installing auxiliary data corresponding to the mispredicted target address into the entry;
initializing a protection limit of the entry to a non-zero value upon installing the auxiliary data;
resetting the protection limit of the entry to the non-zero value based on determining that the auxiliary usefulness level of the entry exceeds a protection threshold;
identifying the entry as unprotected based on having a zero value in the protection limit of the entry;
identifying the entry as protected based on having the non-zero value in the protection limit of the entry;
based on preventing an install of a protected least useful entry, decrementing the protection limit of the protected least useful entry; and
resetting the auxiliary usefulness level of the entry to an initial value based on installing the auxiliary data.

9. The processing system of claim 8, wherein the auxiliary install and update controller is further operable to perform:
increasing the auxiliary usefulness level of the entry upon subsequently determining that the primary branch predictor misprediction indicator is set for the entry after the auxiliary data has been installed into the entry, and either the auxiliary branch predictor used the auxiliary data to correctly predict a branch or the auxiliary usefulness level of the entry is below a training threshold;
reducing the auxiliary usefulness level equally for all entries of the congruence class based on determining that the auxiliary usefulness level of all entries of the congruence class is above a reduction threshold; and
reducing the auxiliary usefulness level equally for all entries of the congruence class based on determining that the auxiliary usefulness level of two entries of the congruence class has reached a maximum value.

10. The processing system of claim 9, further comprising:
a primary search and hit controller that searches the primary branch predictor based on a search address to make a branch prediction;
an auxiliary search and hit controller that searches the auxiliary branch predictor in parallel to the primary search and hit controller; and
a target address selector operable to perform:
selecting an auxiliary predictor branch target from the auxiliary branch predictor corresponding to the search address based on determining that the auxiliary usefulness level of a matching entry of the auxiliary branch predictor is above a usefulness threshold; and
selecting a primary predictor branch target from the primary branch predictor corresponding to the search address based on determining that the auxiliary usefulness level of the matching entry of the auxiliary branch predictor is below the usefulness threshold.

11. The processing system of claim 8, wherein identifying the entry in the congruence class further comprises:
checking the protection limit of each of the entries in the congruence class that identifies whether each of the entries is protected or unprotected from being overwritten; and
identifying the entry in the congruence class having the auxiliary usefulness level set to the least useful level of the entries in the congruence class that are unprotected.

12. The processing system of claim 11, wherein identifying the entry in the congruence class further comprises:
checking the congruence class for an invalid entry;
based on locating the invalid entry in the congruence class, identifying the invalid entry as the entry for updating and setting a validity of the entry to valid; and
based on determining that no invalid entries exist in the congruence class, identifying the entry in the congruence class having the auxiliary usefulness level set to the least useful level with respect to one or more other entries of the congruence class.

13. The processing system of claim 8, further comprising a previous install queue and wherein the auxiliary install and update controller is further operable to perform:
storing records of a plurality of recently successful installs into the auxiliary branch predictor in the previous install queue;

preventing a new install into the auxiliary branch predictor based on locating a matching record in the previous install queue; and invalidating the previous install queue after a queue refresh period has elapsed.

14. The processing system of claim 13, wherein the auxiliary install and update controller is further operable to perform:

invalidating a referenced entry in the auxiliary branch predictor based on determining that a referencing entry in the primary branch predictor has been invalidated, wherein the referencing entry in the primary branch predictor corresponds to the referenced entry in the auxiliary branch predictor; and invalidating a record of the referenced entry in the previous install queue or completely invalidating the previous install queue based on invalidating the referenced entry in the auxiliary branch predictor.

15. A computer program product comprising a non-transitory computer readable storage medium having program instructions embodied therewith, the program instructions executable by a processor comprising a primary branch predictor and an auxiliary branch predictor to cause the processor to:

locate a congruence class of the auxiliary branch predictor based on receiving a primary branch predictor misprediction indicator corresponding to a mispredicted target address of the primary branch predictor;

identify an entry in the congruence class having an auxiliary usefulness level set to a least useful level with respect to one or more other entries of the congruence class;

install auxiliary data corresponding to the mispredicted target address into the entry;

initialize a protection limit of the entry to a non-zero value upon installing the auxiliary data;

reset the protection limit of the entry to the non-zero value based on determining that the auxiliary usefulness level of the entry exceeds a protection threshold;

identify the entry as unprotected based on having a zero value in the protection limit of the entry;

identify the entry as protected based on having the non-zero value in the protection limit of the entry;

based on preventing an install of a protected least useful entry, decrement the protection limit of the protected least useful entry; and reset the auxiliary usefulness level of the entry to an initial value based on installing the auxiliary data.

16. The computer program product of claim 15, wherein the program instructions executable by the processor further cause the processor to:

increase the auxiliary usefulness level of the entry upon subsequently determining that the primary branch predictor misprediction indicator is set for the entry after the auxiliary data has been installed into the entry, and either the auxiliary branch predictor used the auxiliary data to correctly predict a branch or the auxiliary usefulness level of the entry is below a training threshold;

reduce the auxiliary usefulness level equally for all entries of the congruence class based on determining that the auxiliary usefulness level of all entries of the congruence class is above a reduction threshold; and reduce the auxiliary usefulness level equally for all entries of the congruence class based on determining that the auxiliary usefulness level of two entries of the congruence class has reached a maximum value.

17. The computer program product of claim 16, wherein the program instructions executable by the processor further cause the processor to:

search the primary branch predictor and the auxiliary branch predictor in parallel based on a search address to make a branch prediction;

select an auxiliary predictor branch target from the auxiliary branch predictor corresponding to the search address based on determining that the auxiliary usefulness level of a matching entry of the auxiliary branch predictor is above a usefulness threshold; and select a primary predictor branch target from the primary branch predictor corresponding to the search address based on determining that the auxiliary usefulness level of the matching entry of the auxiliary branch predictor is below the usefulness threshold.

18. The computer program product of claim 15, wherein identification of the entry in the congruence class further comprises:

checking the protection limit of each of a plurality of entries in the congruence class that identifies whether each of the entries is protected or unprotected from being overwritten; and identifying the entry in the congruence class having the auxiliary usefulness level set to the least useful level of the entries in the congruence class that are unprotected.

19. The computer program product of claim 18, wherein identification of the entry in the congruence class further comprises:

checking the congruence class for an invalid entry;

based on locating the invalid entry in the congruence class, identifying the invalid entry as the entry for updating and setting a validity of the entry to valid; and based on determining that no invalid entries exist in the congruence class, identifying the entry in the congruence class having the auxiliary usefulness level set to the least useful level with respect to one or more other entries of the congruence class.

20. The computer program product of claim 15, wherein the program instructions executable by the processor further cause the processor to:

store records of a plurality of recently successful installs into the auxiliary branch predictor in a previous install queue;

prevent a new install into the auxiliary branch predictor based on locating a matching record in the previous install queue; and invalidate the previous install queue after a queue refresh period has elapsed.

* * * * *